Figure 4:
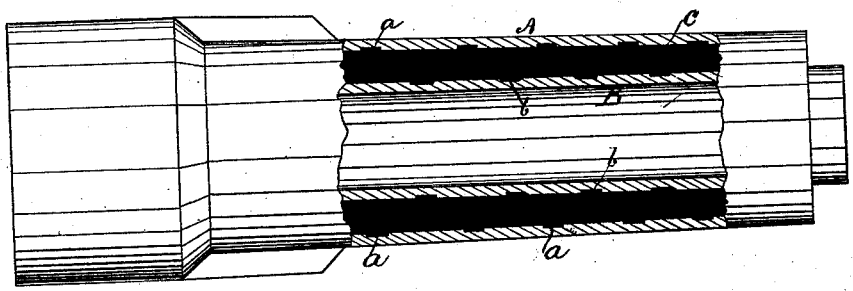

2 Sheets—Sheet 1.
A. J. ROBINSON.
Axle-Box for Vehicles.
No. 223,609. Patented Jan. 13, 1880.
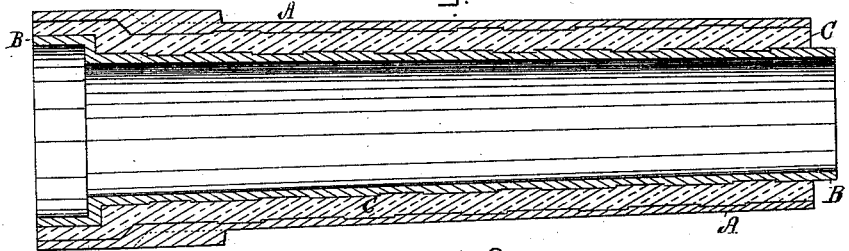
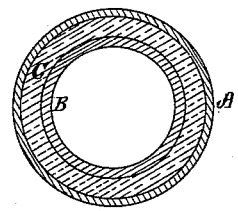
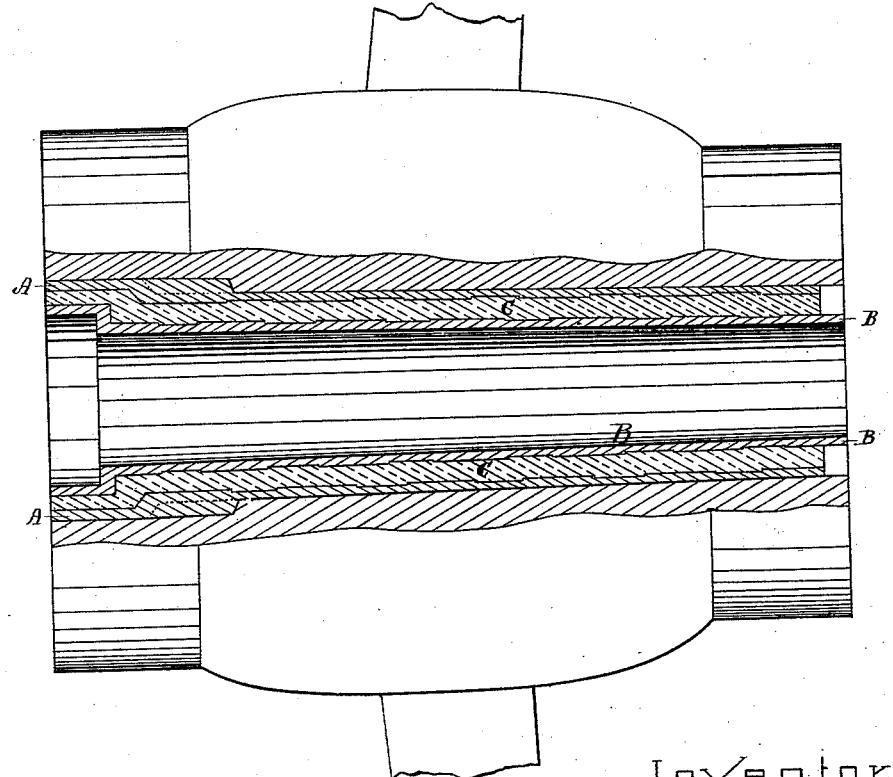
Witnesses.
J. H. Adams
L. W. Möller
Inventor.
Andrew J. Robinson 2 Sheets—Sheet 2.

A. J. ROBINSON.
Axle-Box for Vehicles.

No. 223,609.      Patented Jan. 13, 1880.

Witnesses.
Oscar P. Green
John Cahill.

Inventor.
A. J. Robinson
by J. H. Adams.
Atty.

UNITED STATES PATENT OFFICE.

ANDREW J. ROBINSON, OF BOSTON, MASSACHUSETTS.

AXLE-BOX FOR VEHICLES.

SPECIFICATION forming part of Letters Patent No. 223,609, dated January 13, 1880.

Application filed October 18, 1879.

*To all whom it may concern:*

Be it known that I, ANDREW J. ROBINSON, of Boston, in the county of Suffolk and State of Massachusetts, have invented a new and useful Improvement in Hub-Boxes for Vehicles, of which the following is a specification.

The object of my invention is to produce a simple and effective device to be applied to the hubs of vehicles for the purpose of preventing transmission of the jar from the wheel to the axle.

The invention consists in the combination of two metallic tubes, one of which is of smaller diameter than the other, and arranged within the other, with an interposed packing of rubber or other elastic material between the two tubes, the whole to be applied to the hub of a vehicle.

Referring to the accompanying drawings, Figure 1 represents a longitudinal section of my invention. Fig. 2 is a transverse section of the same. Fig. 3 represents the hub of a wheel, partly in section, showing the application of my device. Fig. 4 represents my invention, partly in section, showing the arrangement of the holes or cavities in the tubes.

My invention is designed as a distinct article of manufacture and sale, and is adapted to be applied to the hub of a wheel in the process of manufacture, and also to a hub already in use.

A represents a metallic tube of suitable thickness, within which is arranged a similar tube, B, of smaller diameter, so as to leave a space between the two for the reception of a packing or fitting of rubber or other suitable elastic material, C, as shown.

In order to prevent any movement of the packing C independently of the tubes, I provide a series of projections on the inner surface of the outer tube and on the outer surface of the inner tube, as shown.

The tubes may be made with a concave surface on the under or inner surface of the outer tube and a corresponding convex surface on the outer side of the inner tube, for the purpose of preventing any longitudinal disarrangement of the elastic packing between the tubes, and the outer surface of the inner tube and inner surface of the outer tube may be provided with longitudinal or spiral corrugations, or with ribs similarly arranged, to prevent any rotary movement of the packing independently of the tubes.

Instead of projections on the respective inner and outer surfaces of the outer and inner tubes, a series of holes or cavities, *a b*, as shown in Fig. 4, may be made, into which the elastic material will be forced. The rubber is first forced into the space between the tubes, and subsequently vulcanized.

In carrying out my invention I force the rubber packing into the space between the tubes under a very powerful pressure, and then subject it to a vulcanizing process, thus filling the cavities in the tubes with the packing and entirely obviating any disarrangement of the packing within the tubes.

By means of my invention an elastic hub-box is always ready for the manufacturer of vehicles, and the same can be readily applied to hubs already in use.

I am aware that an elastic packing or filling used in connection with a hub-box is not new, and such I do not claim; but

What I claim as my invention, and desire to secure by Letters Patent, is—

1. As an article of manufacture, an elastic hub-box for vehicles, composed of metallic tubes of different diameters, and the space between said tubes filled their entire length with rubber or elastic packing, in the manner and for the purpose herein set forth.

2. An elastic hub-box consisting of two metallic tubes, A B, provided with cavities or their equivalents on the inner surface of the outer tube and outer surface of the inner tube, either or both, in combination with an interposed rubber packing, into which recesses the said packing is forced, substantially as and for the purpose set forth.

In testimony whereof I have signed my name to this specification in the presence of two subscribing witnesses.

ANDREW J. ROBINSON.

Witnesses:
J. H. ADAMS,
WILLIE ROGERS.